United States Patent [19]

Pittenger et al.

[11] Patent Number: 5,678,010

[45] Date of Patent: Oct. 14, 1997

[54] AUTOMATED ROUTING OF MESSAGES OVER A NETWORK

[75] Inventors: Paul M. Pittenger, San Mateo, Calif.; Lloyd S. Palmer, Hilliard, Ohio

[73] Assignee: CompuServe Incorporated, Columbus, Ohio

[21] Appl. No.: 488,073

[22] Filed: Jun. 7, 1995

[51] Int. Cl.$^6$ .............................. G06F 17/60; G06G 7/52
[52] U.S. Cl. .................... 395/244; 340/825.3; 395/221; 395/238; 395/239; 395/200.15
[58] Field of Search .................... 235/380; 340/825.3; 380/24, 45; 902/5; 395/201, 216, 217, 218, 221, 235, 238, 239, 244, 200.01, 200.15

[56] References Cited

U.S. PATENT DOCUMENTS 4,386,266  5/1983  Chesarek .................................. 380/25
5,231,570  7/1993  Lee ....................................... 395/238

*Primary Examiner*—Gail O. Hayes
*Assistant Examiner*—Stephen R. Tkacs
*Attorney, Agent, or Firm*—Standley & Gilcrest

[57] ABSTRACT

A system for processing credit card transactions is disclosed. Transaction data to be processed is sent by point of sale terminal to a terminal node connected to a sophisticated communications network. The terminal node uses routing data contained in the transaction data to establish a connection to a verification service host. The connection is established while the terminal node concurrently continues to receive and then validate the transaction data. Overall transaction processing time is reduced because the network connection needed for verification of the transaction data is established while, rather than after, transaction data is received and validated.

7 Claims, 4 Drawing Sheets

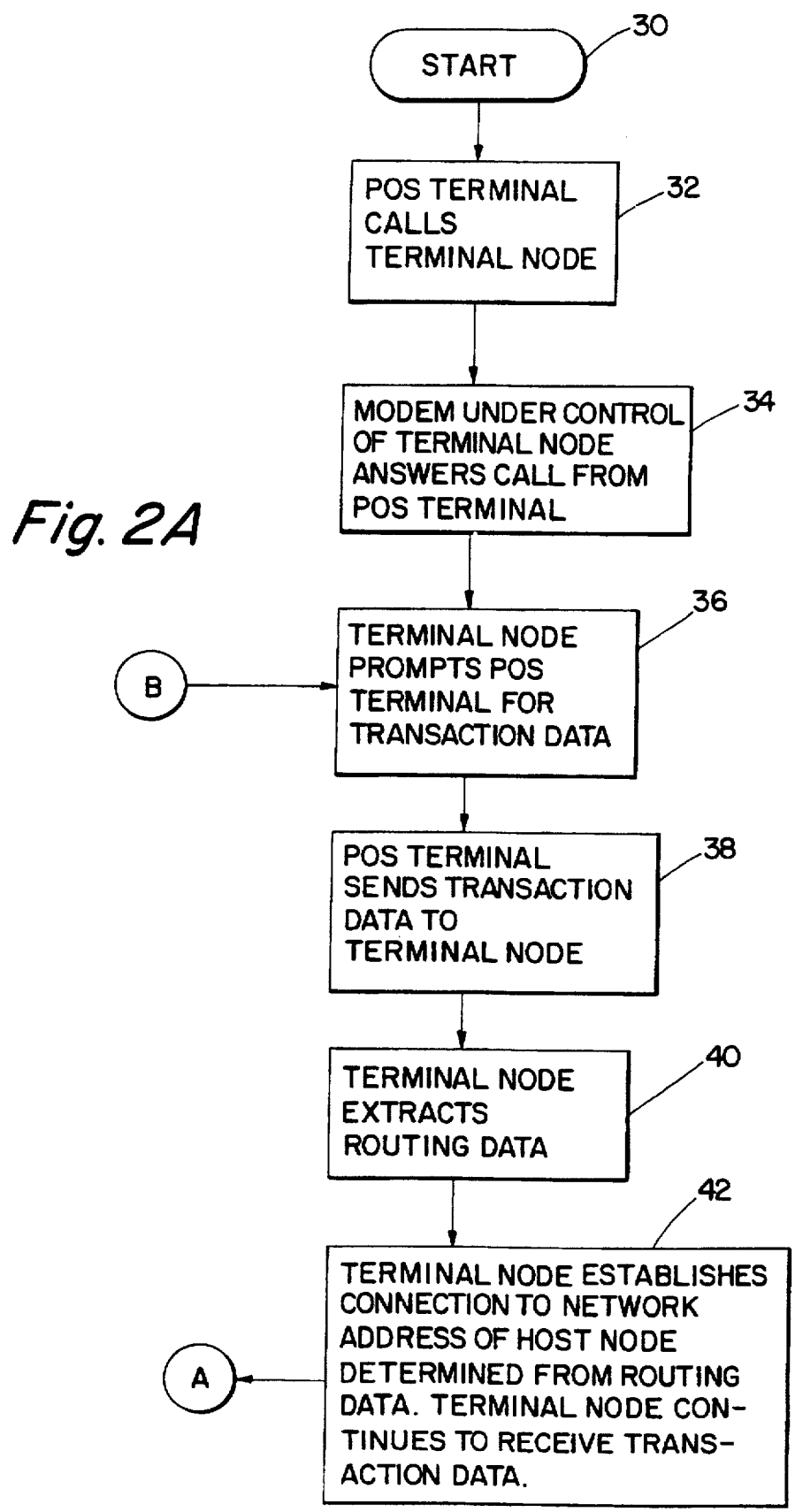

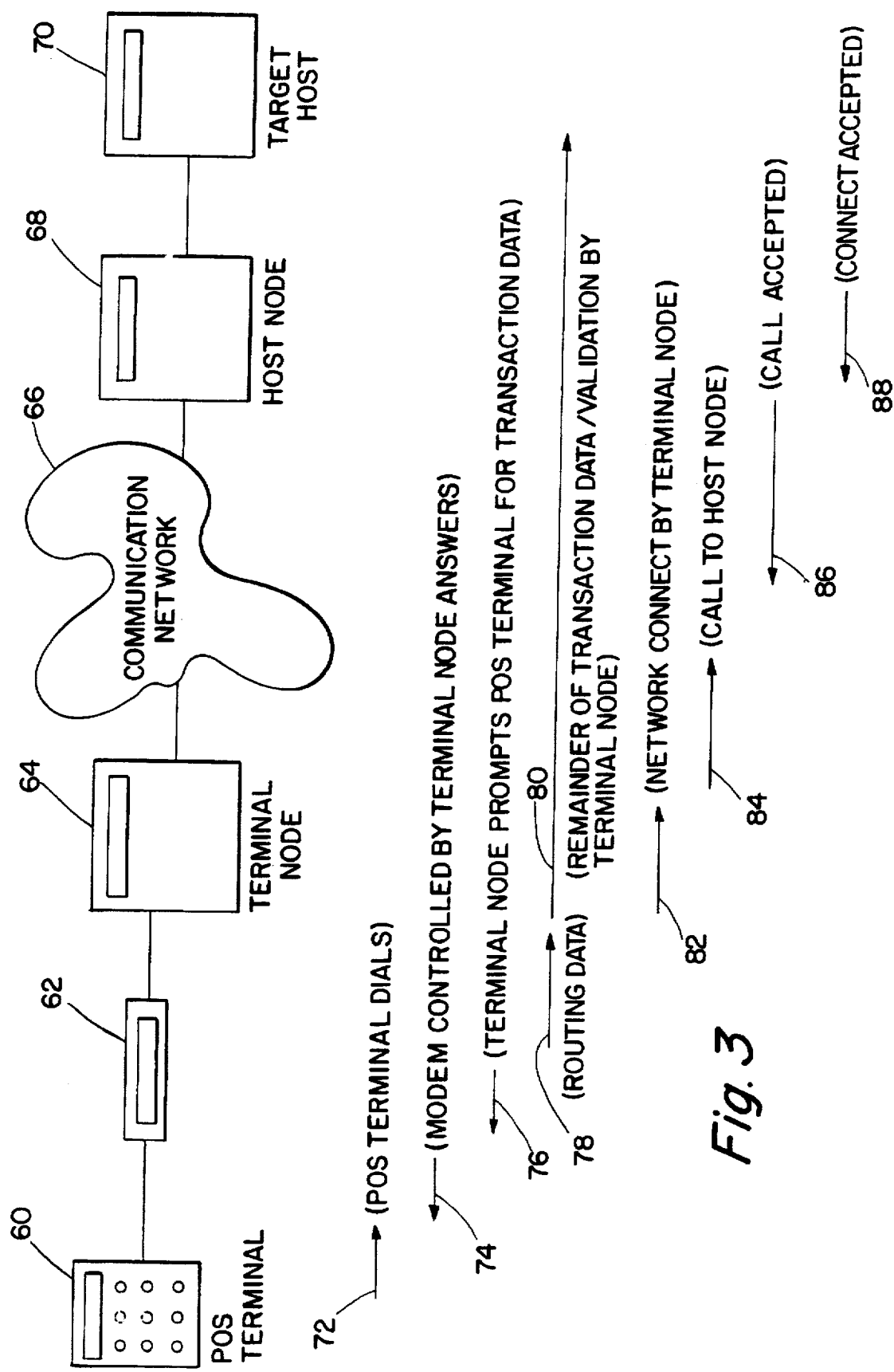

AUTOMATED ROUTING OF MESSAGES OVER A NETWORK

BACKGROUND AND SUMMARY OF THE INVENTION

1. Field of the Invention

The present invention relates generally to systems for effecting point of sale transactions. In particular, the present invention relates to a system for communicating between a point of sale terminal and one of a number of credit verification services. The particular verification service is chosen based on a Bank Identification Number assigned by the credit card administrator to organizations that participate in specific card plans.

2. Background of the Invention

When bank transactions, such as the purchase of au item using a credit card, are originated from a point of sale ("POS") terminal, a message consisting of transaction data is sent from the POS terminal to a verification service over a computer network. The POS terminal has the ability to read the magnetic strip on a credit or debit card (in order to accept card information), to accept data regarding the transaction from a keyboard or other input means, and to originate a telephone call to an appropriate port that can access the verification service-usually, via a sophisticated communications network such as CompuServe. The POS terminal provides, as part of the message, information for a host computer on the communications network to establish a connection with and route the message to a host computer at the proper verification service (the target host). Specifically, the message contains a Bank Identification Number that is used by a host on the communications network to select a verification service. A Bank Identification Number is a unique and individual series of numbers assigned by the credit card administrator to organizations that participate in specific card plans.

In a typical credit card transaction transaction data sent from the POS terminal is verified by a host computer on the communications network before it attempts to connect to the target host. If the transaction data is invalid notification is sent to the POS terminal so the message may be resent. If the transaction data is valid, the host on the communications network extracts routing information from the message and attempts to establish a connection with the target host. If the connection is successful, verification of the transaction may be completed.

SUMMARY OF THE INVENTION

In processing credit card transactions, transaction speed is important because decreases in transaction speed may result in increases in the number of transactions completed during a particular time period. Therefore, an important goal in credit card transaction processing is to reduce the time needed to complete a transaction. The objective of the present invention is further reduce transaction processing time.

The present invention further reduces transaction processing time by establishing a connection with a target node while the transaction data is being received from the POS terminal, but before it is validated. In the event that the transaction data is valid, verification of the transaction may begin as soon as the connection is established. If the connection is established before validation of the transaction data, verification of the transaction may begin immediately following validation. The advantage of the present invention are explained further by the accompanying drawings and detailed description.

BRIEF DESCRIPTION OF THE DRAWINGS

FIG. 2A is a flow chart of the principal steps for completing a credit card transaction;

FIG. 3 is a timing diagram that illustrates the timing for the steps in completing a credit card transaction.

DETAIL DESCRIPTION OF PREFERRED EMBODIMENT(S)

Figure 1:
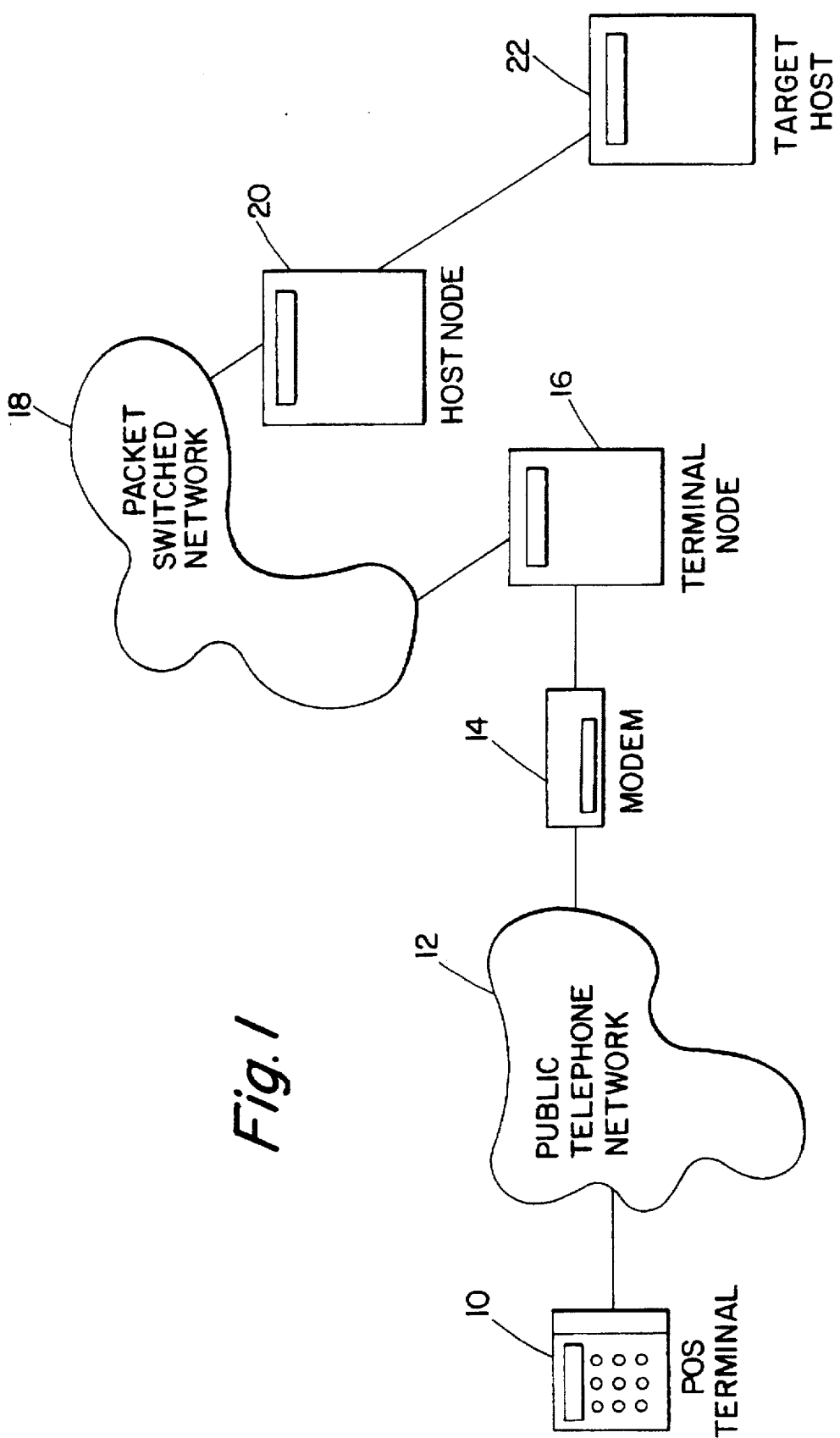
FIG. 1 is a diagrammatic view of the system organization for a preferred embodiment of the present invention.

Referring to FIG. 1, a diagrammatic view of the system organization for a preferred embodiment of the present invention is shown. A POS terminal 10 is connected for communication with a public telephone network (PTN) 12, so that a verification call that will ultimately reach a target host computer 22 at a verification service may be placed over the PTN 12. Preferably, the PTN 12 is connected—via a modem 14—for communication with a communications network 18. The communications network 18 may be a part of the PTN 12, or it may be a separate network accessed by the PTN 12. Preferably, the communications network 18 is capable of establishing a connection with a number of verification services. Preferably, the transaction is processed though a terminal node 16 and a host node 20 that are part of the communications network 18.

The POS terminal 10 is equipped with a card reader for reading the magnetic strip. The POS terminal 10 also has a keyboard or other input means for manually entering the account number and other purchaser and card data. Other means for reading or entering this data may be used as well. The POS terminal 10 will normally also have a display means, such as an LCD display, and printing means, such as a transaction record printer.

Referring to FIG. 2A, the principal steps for processing a credit card transaction are presented. When the transaction is ready for processing, the POS terminal directs a call, preferably through the public telephone network, to the Terminal node 32. Preferably, the terminal node is part of a sophisticated communications network such as CompuServe. A modem, under the control of the Terminal node, answers the call placed by the POS terminal 34. In the next step 36, the Terminal node prompts the POS terminal for the transaction data associated with the current purchase. The POS terminal responds to the request by sending the transaction data to the Terminal node 38. Preferably, the transaction includes routing data that may be used to determine which verification target host should be used to verify the transaction. Preferably, the routing data is located at the beginning of the transaction data and includes a Bank Identification Number (BIN) for selecting a verification service. Preferably, the BIN may be used to locate detailed connect information needed to establish a connection with a target host belonging to the verification service. The BIN may be converted to a communications address through the use of a look-up table or through any other translation method.

Next, the Terminal node extracts the routing data from the transaction data sent by the POS terminal 40. Preferably, the Terminal node starts to establish a connection with the target host at substantially the point at which the routing data has been extracted 42. The attempt to establish the connection is made while the Terminal node continues to receive and then validate transaction data from the POS terminal 42. The ability to establish a network connection with a verification service target host while the remaining transaction data is received and validated is unique to the present invention. The ability to establish the network connection while processing the remaining transaction data reduces the overall processing time because the connection and processing functions are performed concurrently rather than sequentially.

Figure 2B:
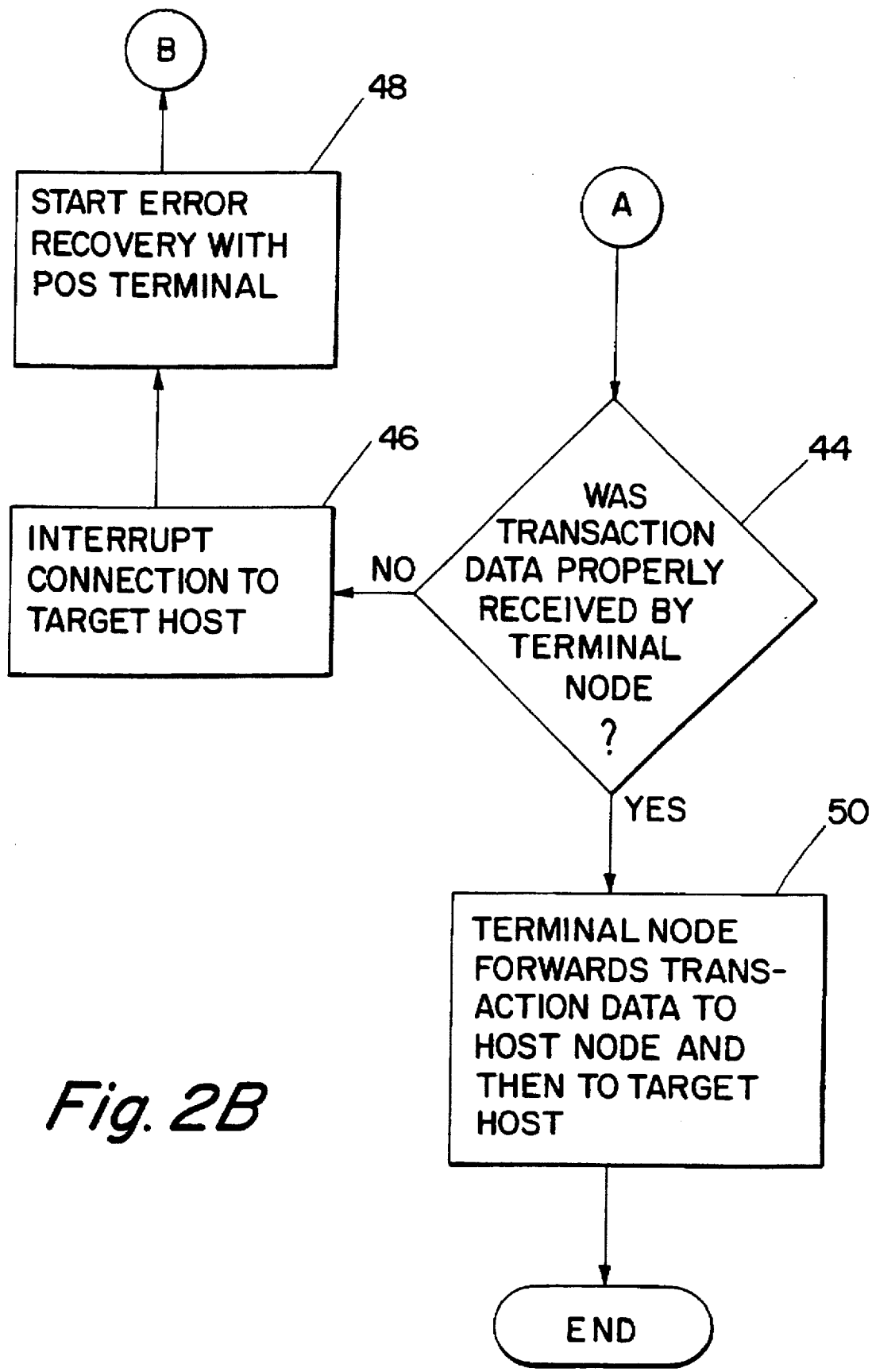
FIG. 2B is a continuation of the flow chart of FIG. 2A.

Referring to FIG. 2B, in the next step-which occurs after the transaction data has been received by the Terminal node-the Terminal node validates the transaction data, preferably by performing a checksum operation on the data 44. The process of performing a checksum operation is well-known in the art and is not explained here. If the transaction data was not properly received, the connection to the target host is interrupted 46. Preferably, an error recovery process is started and the Terminal node prompts the POS terminal to resend the transaction data 48. The error recovery process starts at step 36 of FIG. 2A. If the transaction data was properly received, then the Terminal node may take advantage of the connection that has been established with the target host and transmit the transaction data to the target host for verification 50. Data may flow in both directions in order to complete the authorization of the transaction. One, 2, or more messages may be needed for authorization.

FIG. 3 is a timing diagram that illustrates the timing for the steps in completing a credit card transaction. The figure shows which steps occur sequentially (one step does not begin until the previous has ended) and which steps occur concurrently (more than one step is performed at a given point in time). The arrows indicate the direction of data transmission. The ability to perform some of the operations concurrently—which is unique to the present invention—results in a reduction of the overall transaction processing time. As shown in FIG. 3, the POS terminal 60 connects to the Terminal node 64, preferably via a modem 62 controlled by the Terminal node. Preferably, transaction data is sent to a target host 70 via a host node 68 connected to a communication network 66.

In the first step 72, the POS terminal calls the Terminal node. Next, the Terminal node answers the POS terminal call 74 and prompts the POS terminal for the transaction data 76. The POS terminal then starts transmitting the transaction data 78 to the Terminal node. Until this point, all steps are performed sequentially. In the next step, the Terminal node extracts routing data at substantially the point at which that portion of the transaction containing the routing data arrives at the Terminal node and then initiates a connection to the target host 32. It is at this point that the present invention starts performing concurrent operations. One operation-the network connect operation-consists of the sequential steps of (1) sending a network connect request 82 from the Terminal node 64 to a host node 68, (2) the host node 68 initiating a call 84 to the target host 70; (3) the host node 68 receiving an acceptance 86 from the target host 70, and (4) the host node 68 transmitting to the Terminal node 64 a connect acceptance 88. The other operations performed at the same time as the network connect operation are the sequential operations of first receiving and then validating the remainder of the transaction data past the previously extracted routing data 80. At this point the connection is open so that data may flow in both directions to complete the authorization of the transaction.

A preferred embodiment of the present invention has been described in detail. The description of this particular embodiment is merely illustrative of the principles underlying the inventive concept. It is therefore contemplated that various modifications of the disclosed embodiment will, without departing from the spirit and scope of the present invention, be apparent to persons of ordinary skill in the art.

What is claimed is:

1. A credit card transaction system, comprising:
   a point of sale terminal for transmitting transaction data related to a credit card purchase;
   a terminal node on a communication network, said terminal node capable of receiving, validating, and forwarding said transaction data transmitted by said point of sale terminal;
   a target host at one of a plurality of verification services for verifying said transaction data related to said credit card purchase, said target host capable of receiving said transaction data from said terminal node via said host node on said communication network;
   said terminal node extracting routing data for establishing a connection between said terminal node and said target host from said transaction data while said terminal node receives and validates said transaction data;
   said terminal node initiating a connection between said terminal node and said target host while said terminal node receives and validates said transaction data.

2. The system of claim 1, wherein said target host at one of said plurality of verification services is selected based on a bank identification number in said routing data.

3. The system of claim 1, wherein said connection from said terminal node to said target host is through one or more intermediate nodes connected to said communication network.

4. A method of processing credit card transactions, said method comprising the steps of:
   transmitting transaction data from a point of sale terminal to a terminal node connected to a communications network;
   extracting from said transaction data routing data for establishing a connection between said terminal node and a verification service target host while said terminal node receives and validates said transaction data;
   establishing a connection between said terminal node and said target host, said connection initiated by said terminal node while said terminal node receives and validates said transaction data.

5. The method of claim 4, further comprising the step of selecting one of said plurality of verification services based on a bank identification number in said routing data.

6. The method of claim 4, further comprising the step of connecting from said terminal node to said target host through one or more intermediate nodes connected to said communication network.

7. A credit card transaction system, comprising:
   a point of sale terminal for transmitting transaction data related to a credit card purchase;
   a modem for answering calls initiated by said point of sale terminal;
   a terminal node controlling said modem, said terminal node connected to a communication network and capable of receiving, validating, and forwarding said transaction data transmitted by said point of sale terminal;
   a target host at one of a plurality of verification services for verifying said transaction data related to said credit card purchase, said target host capable of receiving said transaction data from said terminal node via a host node on said communication network;

said terminal node extracting from said transaction data at substantially the point of arrival of said transaction data at said terminal node a bank identification number for selecting a target host computer at one of said plurality of verification services, said bank identification number contained in said transaction data transmitted by said point of sale terminal;

network connection data for establishing a connection between said terminal node and said target host computer, said network connection data located using said bank identification number contained in said transaction data;

said terminal node establishing a connection between said terminal node, a host node on said communication network, and said target host computer, said connection initiated by said terminal node at substantially the point at which said terminal node locates said network connection data;

said terminal node receiving and performing a checksum on said transaction data, said receiving and performing being performed by said terminal node concurrently with said connection.

\* \* \* \* \*